(No Model.)

G. F. EVANS
FRICTIONAL GEARING.

No. 392,111.  Patented Oct. 30, 1888.

Witnesses.
A. F. Hayden.
E. K. Boynton.

Inventor.
G. Frank Evans.
H. E. Lodge Atty.

UNITED STATES PATENT OFFICE.

G. FRANK EVANS, OF SOMERVILLE, MASSACHUSETTS.

FRICTIONAL GEARING.

SPECIFICATION forming part of Letters Patent No. 392,111, dated October 30, 1888.

Application filed March 16, 1888. Serial No. 267,333. (No model.)

*To all whom it may concern:*

Be it known that I, G. FRANK EVANS, a citizen of the United States, residing at Somerville, in the county of Middlesex and State of Massachusetts, have invented certain new and useful Improvements in Frictional Gearing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to mechanism for transmitting motion, which I term "frictional gearing," since it may be employed in connection with pulleys actuated by surface friction only to transmit and convey motion from one line of shafts to another, in lieu of employing toothed gearing, either spur, miter, or bevel gears, as circumstances may require.

The said invention consists in the construction and combination of parts hereinafter particularly set forth and claimed.

Figure 1:
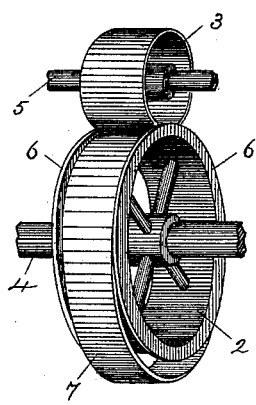
Figure 2:
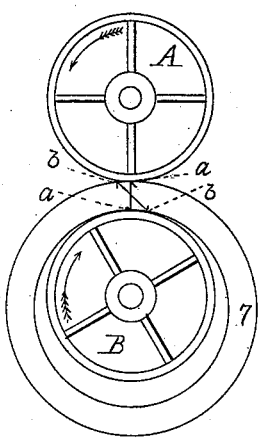
Figure 7:
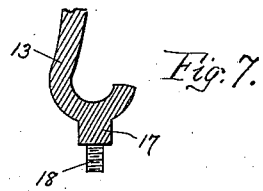
Figure 3:
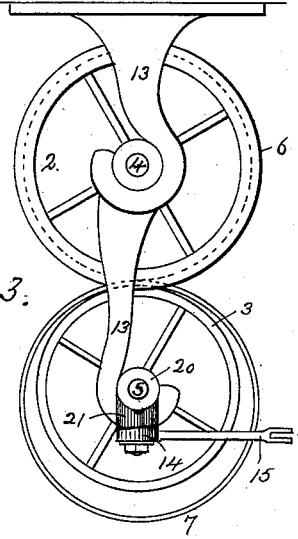
Figure 6:
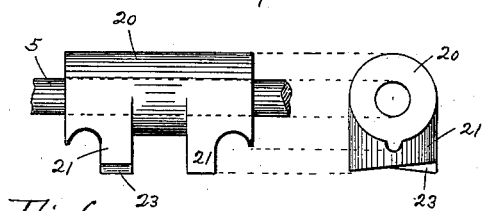

The drawings annexed represent in Figure 1 a frictional gearing embodying my invention as applied to two straight-faced pulleys in elevation. Fig. 2 represents a diagram showing the forces operating in this frictional gearing. Fig. 3 is an end view, and Fig. 4 a front view, of mechanism for adjusting one pulley with respect to the other. Fig. 5 is a plan and side view of the operating-cam enlarged. Fig. 6 is an end and side elevation of the journal-box. Fig. 7 is a sectional view of the lower end of the hanger in Fig. 4.

In said drawings, Fig. 1 represents two straight-faced pulleys, 2 3, mounted, respectively, upon the shafts 4 5, of which 4 is the main actuating one. The driving-pulley 2 is a "rimmed pulley," so called, with flanges 6 6. Loosely encircling the larger pulley, 2, is disposed an endless belt, 7, which passes between said pulleys and is gripped thereby, being caused to do so by means of adjusting mechanism hereinafter described, the surfaces of the pulleys not being in contact.

The principle of frictional gearing is illustrated in the diagram, Fig. 2. The diametrical line *a a* shows the points of contact of the belt 7 when the pulleys are idle, but little pressure remaining upon the belt. The driver is shown at A, the driven pulley at B. The oblique line *b b* shows the points of contact of the belt when the pulleys are in motion. The energy of the driver A is transmitted to the outer face of the belt, and thence forced reversely toward the diametrical line *a a*. In this way the power from the driver A is directed obliquely across the axis of the driven pulley, and produces a thrust upon the latter which causes it to revolve. When the thrust from the driver A is in direction of the line *a a* diametrically of the driven shaft and its pulley B, no rotation is produced.

Figure 4:
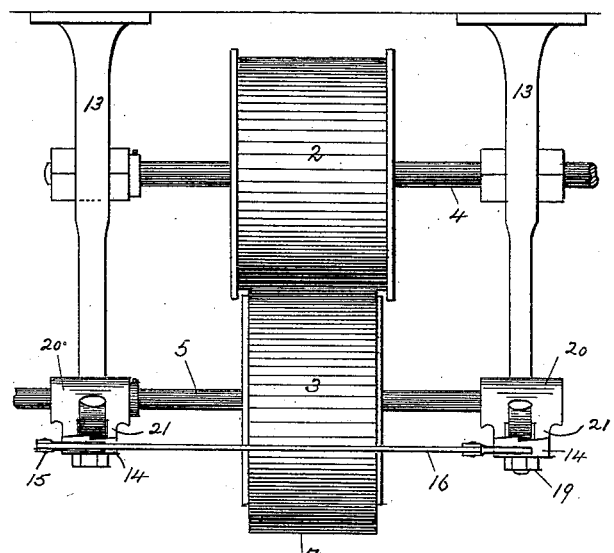
Figure 5:
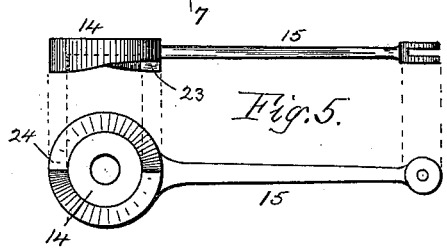

The mechanism for shifting one pulley toward or away from the other I have represented in Figs. 3 and 4 as applied to two straight-faced pulleys, 2 3. The upper shaft, 4, carries the driver, the lower one, 5, the driven pulley 3. Both shafts are suitably journaled in twin hangers 13, the lower shaft being adjustable vertically, to enable the pulley 3 and shaft 5 to become inactive, if desired. This vertical movement is accomplished by aid of a pair of circular cams, 14, operated by levers 15 and united by a connecting-rod, 16, whereby simultaneous and equal adjustment of both ends of the shaft is effected. Said cams, centrally bored, are mounted upon circular studs 17 upon the lowermost part of the hangers 13, which studs are furnished with screw-threaded pins 18, provided with nuts 19. The cams are mounted upon the studs 17 and secured by fastening-nuts 19. The journal-boxes 20 are shown in Fig. 6, and are circular in cross-section midway or at that part where they rest upon the hanger. To secure them upon the latter, and yet permit of their having vertical adjustment, I have cast or otherwise formed upon the under side thereof two arms, 21, the ends of which are reversely and obliquely formed at 23. (See Fig. 6.) These oblique end faces are adapted to co-operate with and slide upon the cam-surfaces 24, formed on one side of the cam 14. By this arrangement of parts it will be seen that the boxes 20, by means of the short arms 21, which straddle the hangers, rest entirely upon the cams. Furthermore, said arms secure the boxes upon the hangers, and yet allow of vertical movement to the boxes and shaft. Said movement is produced by the semi-rotary movement of the cams. Since the latter rest upon the nuts 19 as fixed points, motion of the connecting-rod 16 will raise or lower the boxes 20, according to the direction in which said rod 16 is thrust; hence the driven pulley 3 may be rendered active or inactive, as circumstances require.

What I claim is—

1. In frictional gearing of the class described, the combination, with two pulleys, the surfaces of which are in close proximity, but not contiguous, and the endless band which loosely encircles one pulley and passes between the two pulleys, of the adjusting mechanism composed of the boxes vertically movable in the hangers and the operating-cams, whereby the pulleys are caused to approach or separate one from the other, substantially as and for the purposes herein specified.

2. The combination, with the loose band 7 and the pulleys, one flanged, which grip the same, of the operating mechanism composed of the cams 14, the movable boxes 20, with arms 21, the hangers 13, straddled by the latter, and the actuating lever-rods 15 16, all substantially as herein described.

3. In combination with the hangers 13, provided with the studs 17, screw-threaded pins 18, and the fastening-nuts 19, the operating-cams 14, mounted upon said studs, and the movable boxes 20, resting upon the cams and actuated thereby, substantially as set forth.

In testimony whereof I affix my signature in presence of two witnesses.

G. FRANK EVANS.

Witnesses:
H. E. LODGE,
A. F. HAYDEN.